Jan. 20, 1931.  J. H. STEURER  1,789,607
PHOTO ELECTRIC SOUND TRANSFORMING DEVICE
Filed Jan. 4, 1930   5 Sheets-Sheet 1

Fig.1.

INVENTOR
John H. Steurer
BY
Louis Prevost Whitaker
ATTORNEY Jan. 20, 1931.   J. H. STEURER   1,789,607
PHOTO ELECTRIC SOUND TRANSFORMING DEVICE
Filed Jan. 4, 1930   5 Sheets-Sheet 3

Jan. 20, 1931. J. H. STEURER 1,789,607

PHOTO ELECTRIC SOUND TRANSFORMING DEVICE

Filed Jan. 4, 1930 5 Sheets-Sheet 5

INVENTOR
John H. Steurer
BY
Louis Trevost Whitaker
ATTORNEY

Patented Jan. 20, 1931

1,789,607

UNITED STATES PATENT OFFICE

JOHN H. STEUBER, OF ROCKVILLE CENTER, NEW YORK

PHOTO-ELECTRIC SOUND-TRANSFORMING DEVICE

Application filed January 4, 1930. Serial No. 418,492.

My invention consists in the novel features hereinafter described, reference being had to the accompanying drawings which show one embodiment of the invention selected by me for purposes of illustration, and the said invention is fully disclosed in the following description and claims.

The object of my invention is to provide a simple and economical apparatus which may be installed in any private home, school room, or other suitable place for use in connection with a continuous sound recording photographic film, whereby books, plays, essays, lectures, songs, and other similar compositions capable of being delivered by the human voice, as well as musical compositions, produced by musical instruments, and other sounds, may be recorded upon the sound film, and may be reproduced as desired by any unskilled person without special technical knowledge, and as simply as moving pictures may now be made by the amateur photographer and reproduced in his own home. My invention includes the apparatus hereinafter described, the process or method by which the invention is carried into effect, and the continuous sound film which I have designated as a "talking book". It will be understood that my invention contemplates that while the sound films may be prepared on the machine and reproduced by the same machine, the sound films may also be prepared in quantity by a manufacturer having the necessary copyright authority and sold as merchandise, to be reproduced in the home or elsewhere, or leased for the same purpose, so that the owner of one of these machines may purchase a book recorded vocally on a sound film or talking book and may have the same reproduced in his home, and may likewise hear plays, lectures, music, etc.

In the preparation of the sound film as hereinafter described, a sound record is made in the known manner by forming a plurality of sound tracks on a strip of photographic film, which is subsequently developed and fixed in the usual manner. This film strip is similar to that used for motion pictures, except that no perforations along the edges are required, so that the entire width of the film can be utilized, and a plurality of sound tracks are formed extending alternately in opposite directions lengthwise of the film and occupying the entire width of the film. It is preferred to have an even number of parallel sound tracks, so that by alternately reversing the motion of the film, the film will be left in wound condition on the original reel after use, and so rewinding of the film at the conclusion of either recording or reproduction is not necessary. Owing to the fact that for reproducing ordinary sounds, like the spoken voice, music, etc., a speed of recorded or reproduced vibrations of about 1500 to 2000 per second is sufficient. The film may be made of much less length than would be necessary if it carried pictures. For example with a light gate of approximately 1/1000 of an inch in width and with six parallel sound tracks on the film, a total of from 75 to 100 feet of film per hour is all that is necessary. Further, as ordinary monochromatic film may be used, the cost of the sound records is extremely moderate. The film is also provided at each end of the portion carrying the parallel sound tracks with means for effecting the reversal of the feeding mechanism. For example, the film may be provided with suitable slots into which a movable switch operating element will enter, thereby closing the circuit which effects the reversal of the feed.

The apparatus also includes means for shifting the light gate transversely with respect to the film, so as to bring it into alignment successively with the separate sound tracks whenever the feed of the film is reversed, so as to form a practically continuous operation from one sound track to the next. Where the apparatus is used for recording sounds, a glow lamp is focused on this light gate and is connected to the microphone in the usual manner, by means of an audio amplifying system. For reproducing, a projection lamp is substituted for the glow lamp and its rays are projected through the developed film upon a photo-electric cell, the output of which is passed through an audio amplifier, through a loud speaker or telephone receiver. Where desirable, the audio amplifying elements of an existing radio set and the loud speaker therefor may be used for amplifying purposes. My invention also includes the novel features of construction and combination of parts hereinafter fully described and particularly pointed out in the claims.

Referring to the accompanying drawings which illustrate one embodiment of the apparatus for carrying my invention into effect.

Figure 3:
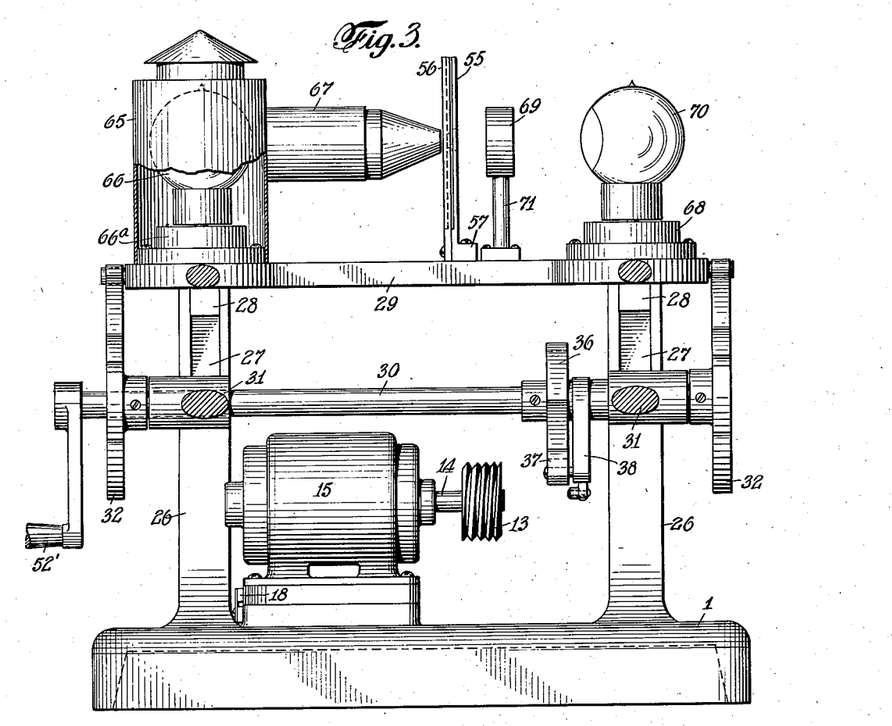
Fig. 3 is an end elevation partly in section.
Figure 4:
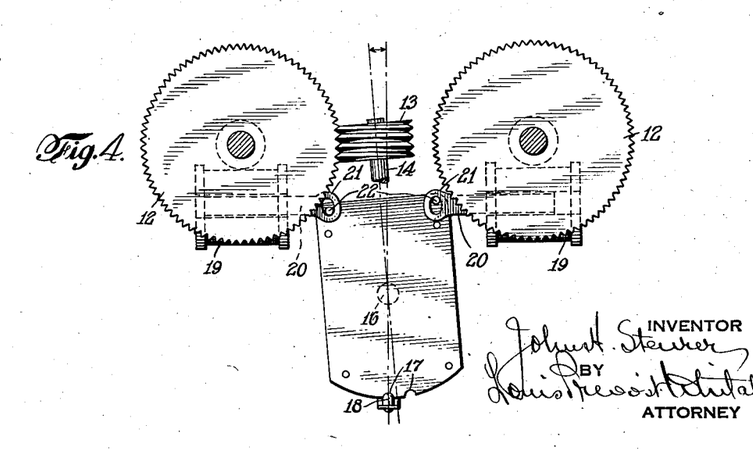
Fig. 4 is a detail view of a portion of the apparatus showing the preferred means for reversing the direction of movement of the film.

Referring to the accompanying drawings, 1 represents the base plate of the machine provided with a pair of vertical supports or columns, 2, 2, carrying at their upper ends bearing plates, indicated at 3, 3. Each of these bearing plates is provided with a spindle, 4, mounted in bearing therein, and provided with a rotary disc, 5, the upper face of which may be conveniently covered with felt or other friction material above which the spindle, 4, projects. A friction disc, 5ª, rests on the disc, 5, and a sleeve, 5ᵇ, loosely surrounding the spindle, so that a film reel, 6, may be placed upon the disc, 5ª, and secured for rotation with the sleeve, 5ᵇ, for example by means of a key, indicated at 7, for engaging a suitable keyway in the reel. The friction between discs, 5 and 5ª, will permit a slip to accommodate variations in the speed of the reels, due to the varying amount of film wound theron. The lower end of each spindle, 4, is provided with a driving member, 8, in this instance a grooved pulley, geared, in this instance, by means of a suitable belt, 9, with a driving member or pulley, 10, on a vertical driving shaft, 11, mounted in the bearing, 3ª, in the plate, 3, and a step bearing, 1ª, on the base plate, 1. Each of the shafts, 11, is provided adjacent to its lower end with a worm wheel, 12, for operatively engaging a worm, 13, on the shaft, 14, of an electric motor, 15. The electric motor is mounted to oscillate on a vertical pivot, indicated at 16, (see Fig. 4) secured to the base plate, and the diameter of the worm, 13, is less than the distance between the worm wheels, 12, 12, so that by oscillating the motor on its pivot, 16, it can be made to engage one worm wheel or the other, to reverse the feed of the film without changing the direction of rotation of the motor shaft. Suitable means are provided for locking the motor in operative relation with one or other of the worm wheels, 12. In this instance the motor base is shown provided with a part having two notches or recesses, indicated at 17, 17, Fig. 4, adapted to be engaged by a spring dog, 18, mounted on the base plate. On opposite sides of the motor, I conveniently provide the solenoids, 19, 19, the movable cores, 20, of which are provided with slotted extensions, 21, engaging pins, 22, on the motor base, so that by energizing one or the other of said solenoids, the motor can be oscillated on its supporting pivot, 16, to carry the worm, 13, from engagement with one of the worm wheels, 12, into engagement with the other worm wheel, to secure the reversal of the direction of movement of the film, as hereinafter more fully explained. The actual feed of the film is secured by means of friction feed wheels, indicated at 23, 23, one of which is carried by the upper end of each of the driving shafts, 11, each feed wheel being provided with idle rolls, indicated at 24, 24, for holding the film in frictional engagement with the adjacent feed wheel, 23. It will be seen that the feed roller, 23, which is being actively driven by the motor, will draw the film from the reel at the opposite end of the machine, and at the same time will drive the adjacent reel through the connection between its shaft, 11, and the reel spindle, so as to wind up the film on one reel as it is drawn off the other, and vice versa, according to the direction of movement of the film. The film reels are provided with suitable friction brakes, indicated at 25, for preventing over movement of the reels in a well known way. On opposite sides of the travel of the film, I provide vertical guides, 26, supported by the base plate and provided with vertical grooves, 27, in their upper portions, to receive guiding members, 28, on a vertically movable frame, 29, which carries the supporting means for the glow lamp or projection lamp, the focusing means, the film guide and plate carrying the light gate, and the support for the photo-electric cell. It will be seen by reference particularly to Figs. 1, 2 and 3, that this frame, 29, is disposed perpendicularly to the plane of the film, and 1 provide means for supporting it in as many different positions vertically, i. e., transversely of the film as there are sound tracks on the film; in this instance in six different vertical positions.

Figure 2:
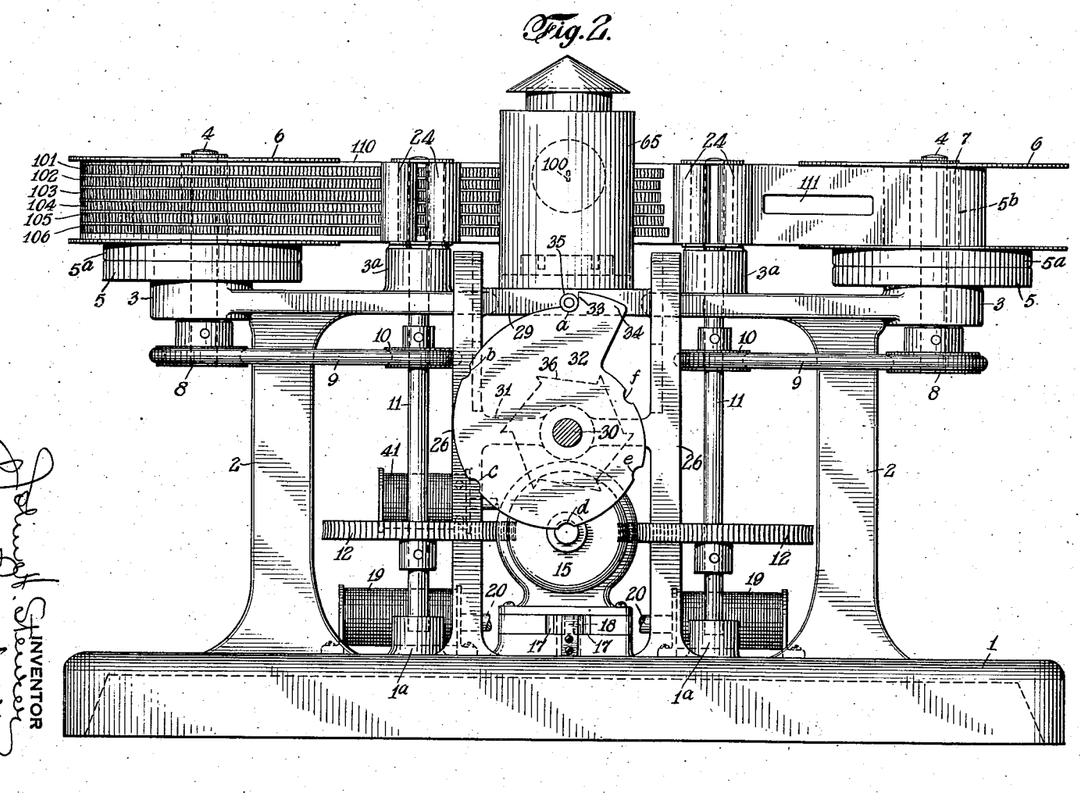
Fig. 2 is a side elevation of the same.

This may be accomplished in many ways, but in this instance I have shown a horizontal shaft, 30, which I term the cam shaft, mounted in bearings in cross arms, 31, connecting the adjacent guides, 26, and provided at each end with a cam, 32, of the well known snail type, provided with six notches on its periphery, lettered a, b, c, d, e and f, located an equal number of degrees from each other and at different distances progressively from the center of shaft, 30. Adjacent to the notch, a, which is at the greatest distance from the center, each cam is provided with an outwardly extending shoulder, 33, forming a projection, 34, the opposite side of which connects with the peripheral portion of the cam adjacent to the notch, f, as best seen in Fig 2. The vertically removable frame, 29, is provided at each end with a friction roll, 35, to engage the adjacent cam, 32, thus supporting the frame and permitting it to be maintained at any one of six positions, corresponding with the notches in the cams, 32, determined by the position of the shaft, 30. As will clearly appear in Fig. 2, in which the frame, 29, is shown in its highest position, and in which figure the position of the light gate is indicated at 100, the rotation of the shaft, 30, to the right in Fig. 2, will lower the frame, 20, and the parts carried thereby, and bring the light gate successively into alignment with any one of six sound tracks, indicated in that figure at 101, 102, 103, etc., on the film indicated at 110.

Figure 5:
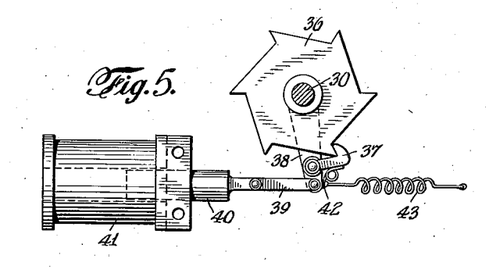
Fig. 5 is a detail view of the apparatus for varying the position of the light gate transversely of the film.

In Fig. 5, I have shown one means for operating the cam shaft, 30, to shift the light gate from one sound track to the other. As therein shown, the cam shaft is provided with a ratchet wheel, 36, having six teeth adapted to be successively engaged by a pawl, 37, carried by a pawl arm, 38, pivotally mounted on the cam shaft and connected by a link, 39, with a core, 40, of a solenoid, 41, the pawl being provided with a spring, 42, to hold it in engagement with the ratchet, and the pawl arm, 38, being provided with the retracting spring, 43. It will be understood that when the solenoid, 41, is energized, the core, 40, will move inwardly sufficiently to turn the ratchet wheel, 36, one-sixth of a revolution, thereby shifting the cams, 32, with respect to the supporting rollers, 35, and from one notch, as a, to the next adjacent notch, as b, thereby lowering the frame, 29, and parts carried thereby, including the light gate, a distance equal to the distance between the centers of adjacent sound tracks, and shifting the light gate from one sound track to the next.

Figure 1:
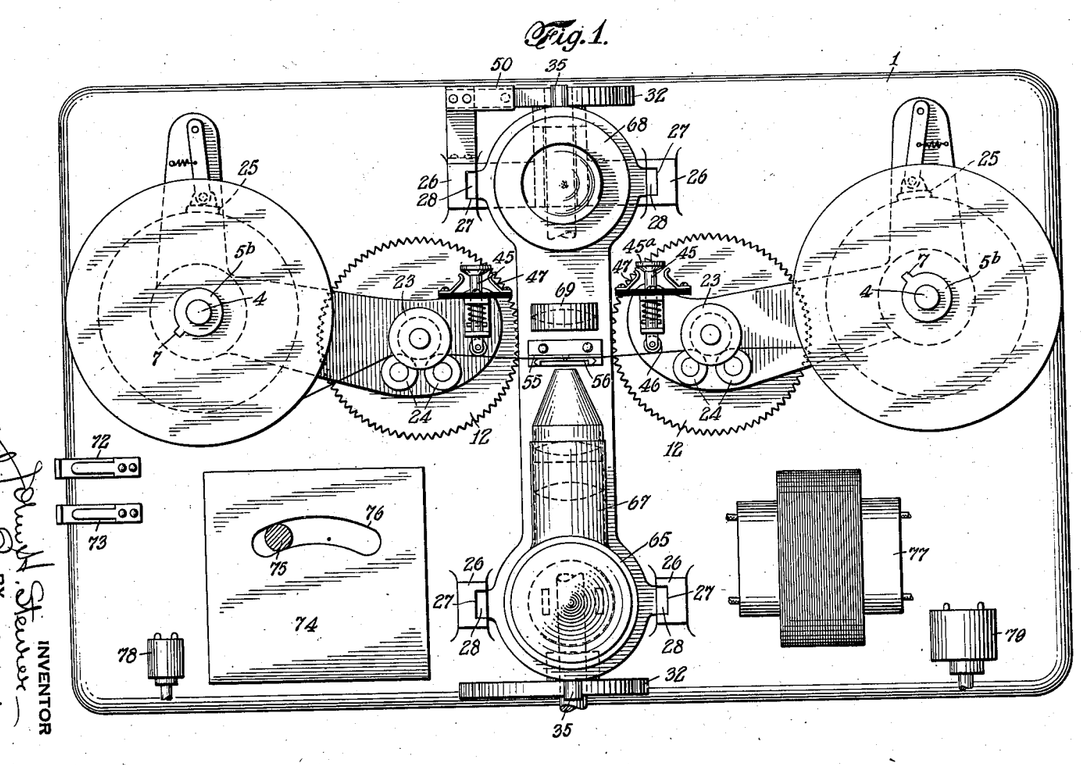
Fig. 1 represents a plan view of the apparatus.
Figure 6:
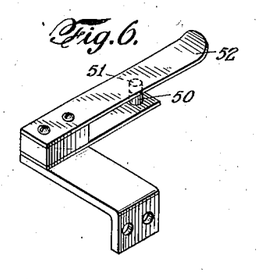
Fig. 6 is a detail view of the limit switch for automatically throwing the apparatus out of operation when the last portion of the final sound track has been passed before the light gate.
Figure 7:
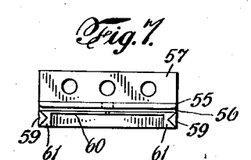
Fig. 7 is an enlarged plan view of the film guide and light gate.
Figure 8:
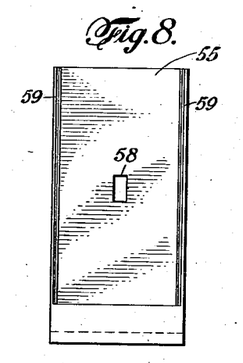
Fig. 8 is a front elevation of the same with the plate carrying the light gate removed.
Figure 9:
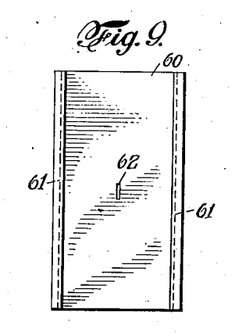
Fig. 9 is a detail view of the removable plate carrying the light gate removed.

I provide means whereby the reversal of the film feed and the lowering of the frame, 29, occurs substantially simultaneously and automatically as soon as the last portion of the sound track in alignment with the light gate has reached the gate. In this instance the film is provided beyond the sound tracks at each end of the same with a centrally located slot, 111, one of which is shown in Fig. 2. It will be understood that at the opposite end of the film and beyond the ends of the sound tracks there is another similar slot. On a suitable portion of the frame, as one of the bearing plates, 3, are mounted a pair of switches, as shown in Fig. 1. Each of these switches comprises a longitudinally movable spring actuated horizontal rod, 45, carrying a roller, 46, at one end, which lightly engages the surface of the film. The opposite end of the rod carries a contact, $45^a$, adapted to engage spring contacts, 47, when one of the slots, 111, is brought opposite to the roller, 46, thereby closing the circuit through the appropriate solenoid, 19, to shift the motor and reverse the feed of the film, and also through solenoid, 41, which is in series with each of the solenoids, 19, and simultaneously effecting the rotation of the shaft, 30, and the lowering of the frame, 29, to carry the light gate to the next adjacent sound track. I also provide a limit switch illustrated in detail in Fig. 6 comprising a fixed contact, 50, and a movable contact, 51, carried by an arm having a projection, 52, extending above one of the cams, 32, as best shown in Fig. 1. When the cams have been rotated completely around so as to bring the rollers, 35, into engagement with the notches, f, of the cams, thus lowering the light gate into position to align it with the lowest sound track. The next operation of the appropriate switch rod, 45, in closing the circuit will effect a further movement of the cams, carrying the rollers, 35, over the peripheral portions between the notches, f, and the projecting portions, 34, and carrying one of the projecting portions, 34, into engagement with the projection, 52, on the limit switch, as in Fig. 6, separating the contacts, 50, 51, and breaking the circuit through the motor, so that the device cannot be further operated until the cams, 32, have been restored to the position shown in Fig. 2. This can be readily done by hand, by disengaging the ratchet, 37, and rotating the shaft, 30, by hand to the left, by any suitable means, as by a handle, $52^1$, indicated in Fig. 3.

The vertically movable frame, 29, is provided centrally with a vertically disposed film guide which supports on one side a removable plate carrying the light gate, as shown in Figs. 1, 3, 7, 8 and 9. The film guide comprises oppositely disposed guide plate, 55, and frame, 59, supported by bracket base, 57, secured to the movable frame, 29. The film travels through slot, 56, formed between plate, 55, and frame, 59, which are of greater vertical length than the width of the film. Plate, 55, is provided with an aperture, indicated at 58, in Fig. 8, adapted to register with the light gate and being slightly larger than the gate. The frame, 59, is provided to receive a removable plate, 60, provided with guiding portions, 61, to engage frame, 59, and hold plate, 60, in position. The plate, 60, is provided with a light gate, indicated at 62, which registers with the aperture, 58, in the film guide when in position. I prefer to make the plate, 60, carrying the light gate, removable, so that a plurality of such plates having light gates of different lengths or widths may be inserted in operative relation with the film guide. This is particularly desirable where the machine is used both for recording and reproducing sounds, as a gate of slightly greater length is preferred for recording than that which can be conveniently used for reproducing. If the machine is used only for one purpose, obviously the light gate may be permanently formed in the film guide by substituting a fixed plate in which a light gate has been formed, for frame, 59, and plate, 60.

At one end of the vertically movable frame, 29, is mounted a lamp hood, indicated at 65, provided with a lamp socket, 66ª, to receive a lamp, indicated at 66, which may be a glow lamp if the machine is to be for recording sounds, or which may be a projection lamp if the machine is to be used for reproducing sounds. The lamp hood is provided with the usual focusing tube, indicated at 67, which has its axis in line with the center of the light gate and its outer end closely adjacent thereto. The opposite end of the frame, 29, is provided with a socket, indicated at 68, to receive a photo-electric cell, indicated at 70, which is used during the reproduction of sounds, and which may be removed when the machine is used for recording. A suitable lens, indicated at 69, may be employed between the light gate and the photo-electric cell as shown, and supported by a bracket, 71, from the frame, 29.

As indicated in Fig. 1, the machine is conveniently provided with jack, 72, for the connection of a loud speaker or telephone receiver when the device is used for reproducing, and a similar jack, indicated at 73, is provided for the attachment of a microphone when the apparatus is used for recording. 74 represents a change-over switch provided with a movable hand operated knob, 75, movable in the slot, 76, for swinging the contacts hereafter referred to from a position to operate the machine as a reproducer to the position required when the machine is operated for recording. I have also shown a transformer, indicated at 77, in the lamp circuit, and have indicated diagrammatically at 78, the power switch for connecting the apparatus with the electric power supply line and the speed control device, 79, for regulating the speed of the motor. These various parts may be of any usual or desired form.

Figure 10:
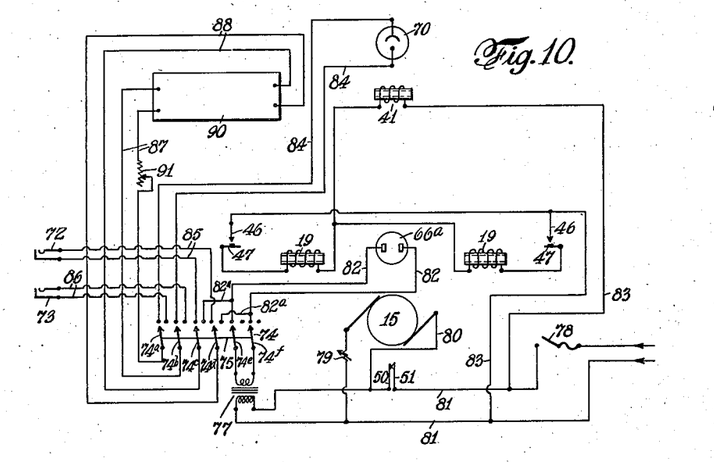
Fig. 10 represents a wiring diagram of the apparatus.

In Fig. 10, I have illustrated a wiring diagram which may be briefly described as follows. 15 shows the motor connected by wires, 80, to the main line, 81, 81, from the source of power when the power switch, 78, is closed, the speed control device or rheostat being indicated at 79, and the limit switch in the motor circuit being indicated at 50, 51, in the motor circuit. The transformer for the lamp circuit is shown at 77, and the lamp socket is indicated at 66ª, having its contacts connected by wires, 82, 82, with the transformer through the fixed and movable contacts of the change-over switch, which is indicated as a whole at 74. In a branch of the main power circuit, indicated by the wires, 83, 83, are located the solenoids, 19, 19, and their controlling switches, indicated at 46, 47, and in the same branch is located the solenoids, 41, for operating the cam shaft, which is connected in such manner that it will be energized whenever either of the solenoids, 19, is energized. 70 represents the photo-electric cell, the terminals of which are connected by wires, 84, 84, with fixed contacts on the change-over switch, 74, and 72 represents the jack of the loud speaker, which is connected with fixed contacts on the change-over switch by wires, 85, 85. 73 represents the jack for the microphone, also connected to fixed contacts on the change-over switch, by wires, 86, 86. 90 represents an audio amplifying unit, which may be a special unit of known construction operating only in conjunction with this apparatus, or it may be the audio amplifying unit of a radio receiving set, if desired. It is connected by wires, 87, 87, with movable contacts, 74ª and 74ᵇ, of the change-over switch, which are adapted to be connected with the fixed contacts leading to the photo-electric cell or to the microphone, as the case may be, and the amplifying unit is also connected by wires, 88, 88, with movable contacts, 74ᶜ and 74ᵈ, of the change-over switch, which are adapted to be connected with fixed contacts leading to the loud speaker jack, 72, or to contacts leading to the lamp socket, 66ª. The audio amplifying circuit may be provided with a variable resistance, 91, or other suitable means for varying the volume of sound produced at the loud speaker or telephone receiver. The change-over switch is also provided with movable contacts, 74$^e$ and 74$^f$, which in the position shown connect the transformer with the lamp socket, when the projection lamp is used for reproducing sounds. The lamp circuit wires, 82, 82, are also connected by branch wires, 82$^a$, 82$^a$, with additional fixed contacts on the change-over switch, to which the movable contacts, 74$^c$ and 74$^d$, can be moved when the microphone is connected, and a glow lamp is inserted in the socket, 66. The movable contacts of the change-over switch are shown connected by a bar with the finger piece, 75, so that they may all be simultaneously swung from the reproducing position to the recording position.

In the positions of the parts indicated in the diagram, it will be understood that the machine is arranged for reproducing sounds by means of the sound tracks on the traveling film. Under such circumstances it will be understood that a projecting lamp is inserted in the socket, 66, and a photo-electric cell, 70, is connected through the movable contacts, 74$^a$, 74$^b$, with the audio amplifier, by wires, 87, 87, and thence by wires, 88, 88, and movable contacts, 74$^c$ and 74$^d$, with wires, 85, 85, leading to the loud speaker jack, 72, to which will be connected either a loud speaker or a telephone receiver or head set, as desired. Assuming that a film has been placed in position and led from the containing reel between the feed rolls, 23, and their idle rolls, and connected to a receiving reel in the usual manner, when the main switch, 78, is closed, the motor, 15, will be started, and the projection lamp lighted. The film will be fed past the light gate, which will be in position to register with the uppermost of the parallel sound tracks, and as the sound track (101) moves past the light gate, the light in variable degree will be projected to the photo-electric cell, producing variations of current which are transmitted through the audio amplifier to the loud speaker or telephone receiver. The reproduction of the sounds recorded on the sound track will be continued until the end of the sound track passes the light gate, when the appropriate slot, 111, will be brought below the adjacent switch roller, 46, permitting the switch to close and energize one of the solenoids, 19, and the solenoid, 41, reversing the feed of the film and simultaneously rotating the cam shaft, so as to lower the frame 29, and bring the light gate into alignment with the second sound track, 102. The operation continues until each sound track has been passed before the light gate, as before described, when, if there are an even number of sound tracks the film will have been wound up upon the original reel upon which it was carried, and the last operation of the cam shaft will open the limit switch, 50, 51, and stop the motor, and break the main power circuit. The operator will then open the main switch, 78, and by means of the handle, 52, or other suitable means return the cam shaft to its original position, raising the frame, 29, to its highest position when the machine is in condition for further operation with the same film or a different film.

When it is desired to use the apparatus for the purpose of recording sounds, the change-over switch will be operated by swinging the button, 75, to the right Figs. 1 and 10, thereby changing the position of the movable contacts of the switch. The projection lamp will be removed from the socket, 66, the photo-electric cell may be removed, the loud speaker or telephone receiver is disconnected from the jack, 72, and the microphone is connected with the jack, 73. In this position of the parts the microphone circuit will pass through the wires, 86, and fixed contacts of the change-over switch to the movable contacts, 74$^a$, and 74$^b$, thereof, thence to the audio amplifier through wires, 87, 87, and by wires, 88, 88, to the movable contacts, 74$^c$, 74$^d$, which will then connect the fixed contacts leading through wires, 82$^a$, 82$^a$, and 82, 82, to the glow lamp, which will operate responsively to the microphone circuit, the transformer being disconnected from the lamp circuit by the movement of the movable contacts, 74$^e$, 74$^f$. In this position of the apparatus it is ready for recording sound vibrations impressed upon the microphone in a well known way, it being understood in such case a reel of unexposed sensitive photographic film will be fed back and forth through the machine, and that the frame, 29, will be lowered when each end of the film, which is provided with the slots, 111, 111, engage the appropriate switch rolls. While the machine could be operated in the dark, it will be understood that it will be protected from the light by suitable enclosing casing, not shown, which will prevent any light except that passing from the glow lamp through the light gate, from reaching the film.

It will be understood that variations may be made in the specific construction of the apparatus hereinbefore described without departing from the spirit of my invention. For example as illustrated in Fig. 11, I may provide the shaft, 114, of the motor, 115, with a friction wheel, 113, to engage alternately friction wheels, 112, for driving the film feed mechanism, instead of using the worm and a worm wheel construction shown in Fig. 4, and in case there are undesirable fluctuations in the motor current, the motor shaft may be extended and provided with a governor, indicated at 115$^a$, diagrammatically illustrated in Fig. 11, of the well known phonograph type, to insure a practically constant speed of the motor under the control of the rheostat or speed regulator, 79.

Figures 11, 12:
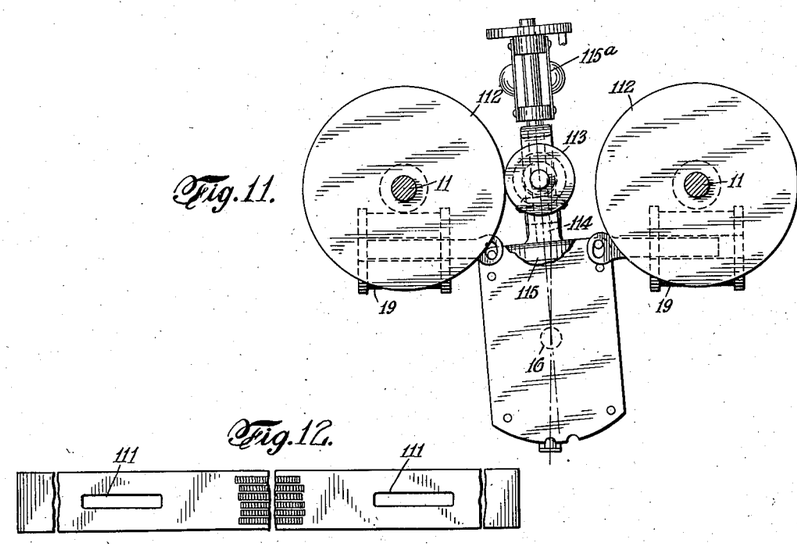
Fig. 11 is a view similar to Fig. 4 showing a slight modification.
Fig. 12 is a partial plan view of my improved record film or talking book.

In Fig. 12, I have illustrated the end portions of my improved reproducing film, bearing the series of parallel sound tracks and provided with slots, 111, co-operating with the reversing switches, the central portion of the film being broken away.

Figure 13:
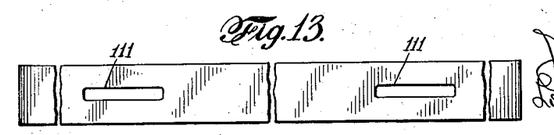
Fig. 13 is a similar view of the blank film before sound tracks are recorded thereon.

In Fig. 13, I have illustrated in the same manner a film which is used for recording purposes, which it will be noted is provided with the same slots for effecting the reverse of movement of the feed mechanism, but upon which the sound tracks have not yet been recorded. I wish it to be understood, however, that I do not limit myself to the specific reversing means shown and described, it being only necessary that the film be provided adjacent to each end of the portion occupied or to be occupied by the parallel sound tracks, with means adapted to co-operate with devices connected with the reversing mechanism to bring the latter into operation when the reversal of movement of the film is desired.

What I claim and desire to secure by Letters Patent is:—

1. In apparatus of the kind described, the combination with means for supporting and reversibly feeding a film of a width to accommodate a plurality of sound tracks, a movable supporting frame, disposed perpendicularly to the film and adjacent to one edge thereof, photo-electric sound transforming devices carried thereby, rotary supporting means for said frame provided with faces at different distances from the axis thereof to engage parts connected with said frame, and means for effecting a partial rotation of said supporting means when the direction of feed of the film is reversed.

2. In apparatus of the kind described, the combination with means for supporting a film with its length extending horizontally and its faces vertically, of a horizontally disposed frame, disposed perpendicularly to the film and adjacent to one edge thereof, rotary cams having portions at different distances from their axes, for supporting the frame, photo-electric sound transforming devices carried by said frame, and means for imparting a partial rotation to said cams when the direction of movement of said film is reversed.

3. In apparatus of the kind described, the combination with means for supporting and reversibly feeding a film of a width to accommodate a plurality of sound tracks, a movable supporting frame, disposed perpendicularly to the film and adjacent to one edge thereof, photo-electric sound transforming devices carried thereby, rotary supporting means for said frame provided with faces at different distances from the axis thereof to engage parts connected with said frame, means for effecting a partial rotation of said supporting means, to shift the position of said frame, and means carried by the film adjacent to the opposite ends of the sound track receiving portion thereof for bringing said shifting means into operation.

4. In apparatus of the kind described, the combination with means for supporting a film of a width to accommodate a plurality of sound tracks, means for feeding the film in either direction, reversing means for said feeding means, a movable frame disposed perpendicularly to the film and adjacent to one edge thereof, photo-electric sound transforming devices carried by said frame, means for shifting said frame to align said devices with a different sound track portion thereof, and means carried by the film adjacent to each end of the sound track receiving portion thereof, for automatically bringing said feed reversing means and said frame shifting means into operation.

5. In apparatus of the kind described, the combination with means for supporting and reversibly feeding a film of a width to accommodate a plurality of sound tracks, a movable supporting frame, disposed perpendicularly to the film and adjacent to one edge thereof, photo-electric sound transforming devices carried thereby, rotary supporting means for said frame provided with faces at different distances from the axis thereof to engage parts connected with said frame, electro-magnetic shifting means for effecting a partial rotation of said supporting means, circuit controlling means for said shifting means including a switch having a part engaging the film, the film being provided at each end of the light track receiving portion thereof with means for engaging said switch part.

6. In apparatus of the kind described, the combination with means for supporting and reversibly feeding a film of a width to accommodate a plurality of sound tracks, a movable supporting frame, disposed perpendicularly to the film and adjacent to one edge thereof, photo-electric sound transforming devices carried thereby, rotary supporting means for said frame provided with faces at different distances from the axis thereof to engage parts connected with said frame, electromagnetic shifting means for effecting a partial rotation of said supporting means, circuit controlling means for said shifting means including a switch having a part engaging the film, the film being provided at each end of the light track receiving portion thereof with an aperture to engage said switch part to effect the operation of said switch.

7. In apparatus of the kind described, the combination with means for supporting a film of a width to accommodate a plurality of sound tracks, means for feeding the film in either direction, reversing means for said feeding means, a movable frame disposed perpendicularly to the film and adjacent to one edge thereof, photo-electric sound transforming devices carried by said frame, means for shifting said frame to align said devices with a different sound track thereof, said reversing and shifting means being electromagnetically operated, a control switch for both of said reversing and shifting means, having a part for engaging the film and held thereby in inoperative position, said film being provided at each end of its light track receiving portions with means for engaging said part and operating said switch.

8. In apparatus of the kind described, the combination with means for supporting a film of a width to accommodate a plurality of sound tracks, means for feeding the film in either direction, reversing means for said feeding means, a movable frame disposed perpendicularly to the film and adjacent to one edge thereof, photo-electric sound transforming devices carried by said frame, means for shifting said frame to align said devices with a different sound track thereof, said reversing and shifting means being electromagnetically operated, a control switch for both of said reversing and shifting means, having a part for engaging the film and held thereby in inoperative position, said film being provided at each end of its light track receiving portions with apertures for engaging said part to effect the operation of said switch.

9. In apparatus of the kind described, the combination with means for supporting a film of a width to acommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor provided with a rotary member located between said driving member and movable into engagement with either, electro-magnetic means for shifting said rotary member to reverse the direction of feed of the film, controlling means for said shifting means, having a part for engaging the film and operable thereby.

10. In apparatus of the kind described, the combination with means for supporting a film of a width to accommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor provided with a rotary member located between said driving member and movable into engagement with either, electro-magnetic means for shifting said rotary member to reverse the direction of feed of the film, controlling means for said shifting means, having a part for engaging the film, said film having apertures at each end of the sound track receiving portion thereof, for engaging said part and operating the shifting means.

11. In apparatus of the kind described, the combination with means for supporting a film of a width to accommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor provided with a rotary member located between said driving member and movable into engagement with either, oppositely disposed electro-magnetic devices for shifting said rotary part, switches located on opposite sides of said frame, each connected with one of said electro-magnetic devices, and having a part for engaging tripping means carried by the film.

12. In apparatus of the kind described, the combination with means for supporting a film of a width to accommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor pivotally mounted and provided with a rotary part located between said driving members and adapted to be engaged with either, electro-magnetic means for swinging said motor on its pivot to shift the said rotary part, and controlling means for said electro-magnetic means having a part for engaging the film and operable by a tripping portion thereof.

13. In apparatus of the kind described, the combination with means for supporting a film of a width to accommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor pivotally mounted and provided with a rotary part located between said driving members and adapted to be engaged with either, oppositely disposed electro-magnetic devices operatively connected with the motor for shifting the rotary part thereof, switches located on opposite sides of said frame, each connected with one of said electro-magnetic devices, and each provided with a part for engaging the film and operable by tripping means carried thereby.

14. In apparatus of the kind described, the combination with means for supporting a film of a width to accommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor pivotally mounted and provided with a rotary part located between said driving members and adapted to be engaged with either, oppositely disposed solenoids having movable cores connected with said motor, switches located on opposite sides of said frame, each connected with one of said solenoids, each of said switches having a part engaging the film and holding it out of operation, and a film provided at each end of its track receiving portion with means for tripping the film engaging parts of said switches.

15. In apparatus of the kind described, the combination with means for supporting a film of a width to accommodate a plurality of sound tracks, means for feeding the film in either direction, electro-magnetic means for reversing the direction of feed of said film, a frame disposed perpendicularly to the film adjacent to one edge thereof, photo-electro sound transforming devices carried by said frame, shifting means for said frame including rotary supporting cams, having portions at different distances from their common axis of rotation for engaging parts connected with said frame, electro-magnetic means for imparting successive partial rotary movements to said cam, stops on said cams for limiting the rotary movement thereof, switch mechanism in circuit with said electro-magnetic shifting means and reversing means, and having a tripping part for engaging the film.

16. In apparatus of the kind described, the combination with means for supporting a film of a width to accommodate a plurality of sound tracks, means for feeding the film in either direction, electro-magnetic means for reversing the direction of feed of said film, a frame disposed perpendicularly to the film adjacent to one edge thereof, photo-electro sound transforming devices carried by said frame, shifting means for said frame including rotary supporting cams, having portions at different distances from their common axis of rotation for engaging parts connected with said frame, electro-magnetic means for imparting successive partial rotary movement thereof, switches for controlling said reversing means and shifting means located on opposite sides of said frame, each having a tripping part for engaging the film, and a film provided adjacent to each end of the track receiving portion with an aperture for engaging the tripping portion of one of said switches.

17. In apparatus of the kind described, the combination with means for supporting a film of a width to accommodate a plurality of sound tracks, means for feeding the film in either direction, electro-magnetic means for reversing the direction of feed of said film, a frame disposed perpendicularly to the film adjacent to one edge thereof, photo-electro sound transforming devices carried by said frame, shifting means for said frame including rotary supporting cams, having portions at different distances from their common axis of rotation for engaging parts connected with said frame, electro-magnetic means for imparting successive partial rotary movements to said cam, stops on said cams for limiting the rotary movement thereof, switch mechanism in circuit with said electro-magnetic shifting means and reversing means, and having a tripping part for engaging the film, and a master cut out switch operable by said cams at the limit of their rotary movement in one direction.

18. In apparatus of the kind described, the combination with means for supporting a film of a width to accommodate a plurality of sound tracks, means for feeding the film in either direction, electro-magnetic means for reversing the direction of feed of said film, a frame disposed perpendicularly to the film adjacent to one edge thereof, photo-electro sound transforming devices carried by said frame, shifting means for said frame including rotary supporting cams, having portions at different distances from their common axis of rotation for engaging parts connected with said frame, electro-magnetic means for imparting successive partial rotary movements to said cam, stops on said cams for limiting the rotary movement thereof, switch mechanism in circuit with said electro-magnetic shifting means and reversing means, and having a tripping part for engaging the film, and a master cut out switch having a movable part in position to be engaged by one of the stops for limiting the rotary movement of said cams in one direction.

19. In apparatus of the kind described, the combination with means for supporting a film of a width to accommodate a plurality of sound tracks, means for feeding the film in either direction, reversing means for said feeding means, a movable frame disposed perpendicularly to the film and adjacent to one edge thereof, photo-electric sound transforming devices carried by said frame, means for shifting said frame to align said devices with a different sound track portion thereof, a film provided adjacent to each end of the sound track receiving portion thereof, for automatically bringing said feed reversing means and said shifting means into operation, a film guide carried by said frame, and a removable plate provided with a light gate detachably supported by said film guide.

20. In apparatus of the kind described, the combination with means for supporting a film of a width to accommodate a plurality of sound tracks, means for feeding the film in either direction, reversing means for said feeding means, a movable frame disposed perpendicularly to the film and adjacent to one edge thereof, photo-electric sound transforming devices carried by said frame, means for shifting said frame to align said device with a different sound track portion thereof, a film provided adjacent to each end of the sound track receiving portion thereof, for automatically bringing said feed reversing means and said shifting means into operation, a film guide carried by said frame, and a removable plate provided with a light gate detachably supported by said film guide, said film guide being provided with a plate portion on the opposite side of the film from said plate, and having therein an aperture larger than the light gate in said plate.

21. In apparatus of the kind described, the combination with means for supporting a film of a width to accommodate a plurality of sound tracks, a frame disposed perpendicularly to the film and adjacent to one edge thereof, photo-electric sound transforming devices carried by said frame, means for shifting said frame to align said devices with a different sound track, feed rollers on opposite sides of said frame for feeding the film in opposite directions respectively, a rotary driving member for each of said feed rollers, an electric motor pivotally mounted and provided with a rotary part located between said driving members and adapted to be engaged with either, electromagnetic means for swinging said motor on its pivot to shift the said rotary part, and controlling means for said electro-magnetic means having a part for engaging the film and operable by a tripping portion thereof, and means for locking the motor in each of its adjusted positions.

22. In apparatus of the kind described, the combination with means for supporting a film, means for feeding the film in either direction, reversing means for said feeding means, a movable frame disposed perpendicularly to the film and adjacent to one edge thereof, photo-electric sound transforming devices carried by said frame and including a source of illumination, focusing means, a photo-electric cell operatively connected with sound reproducing devices, means for shifting said frame to align said focusing means with different sound track portions of the film, and a film provided with a plurality of parallel sound tracks extending alternately in opposite directions and occupying substantially the entire width of the film, and having at each end of said sound track receiving portion tripping means for automatically bringing said feed reversing means and said frame shifting means into operation.

23. In apparatus of the kind described, the combination with means for supporting a film, means for feeding the film in either direction, reversing means for said feeding means, a movable frame disposed perpendicularly to the film and adjacent to one edge thereof, photo-electric sound transforming devices carried by said frame and including a source of illumination, focusing means, a photo-electric cell operatively connected with sound reproducing devices, means for shifting said frame to align said focusing means with different sound track portions of the film, and a film provided with a plurality of parallel sound tracks extending alternately in opposite directions and occupying substantially the entire width of the film, and having at each end of said sound track receiving portion tripping means, devices for automatically bringing said feed reversing means and said frame shifting means into operation, having tripping parts for engaging the film and operable by the tripping portions thereof.

In testimony whereof I affix my signature.

JOHN H. STEURER.